Patented Aug. 28, 1928.

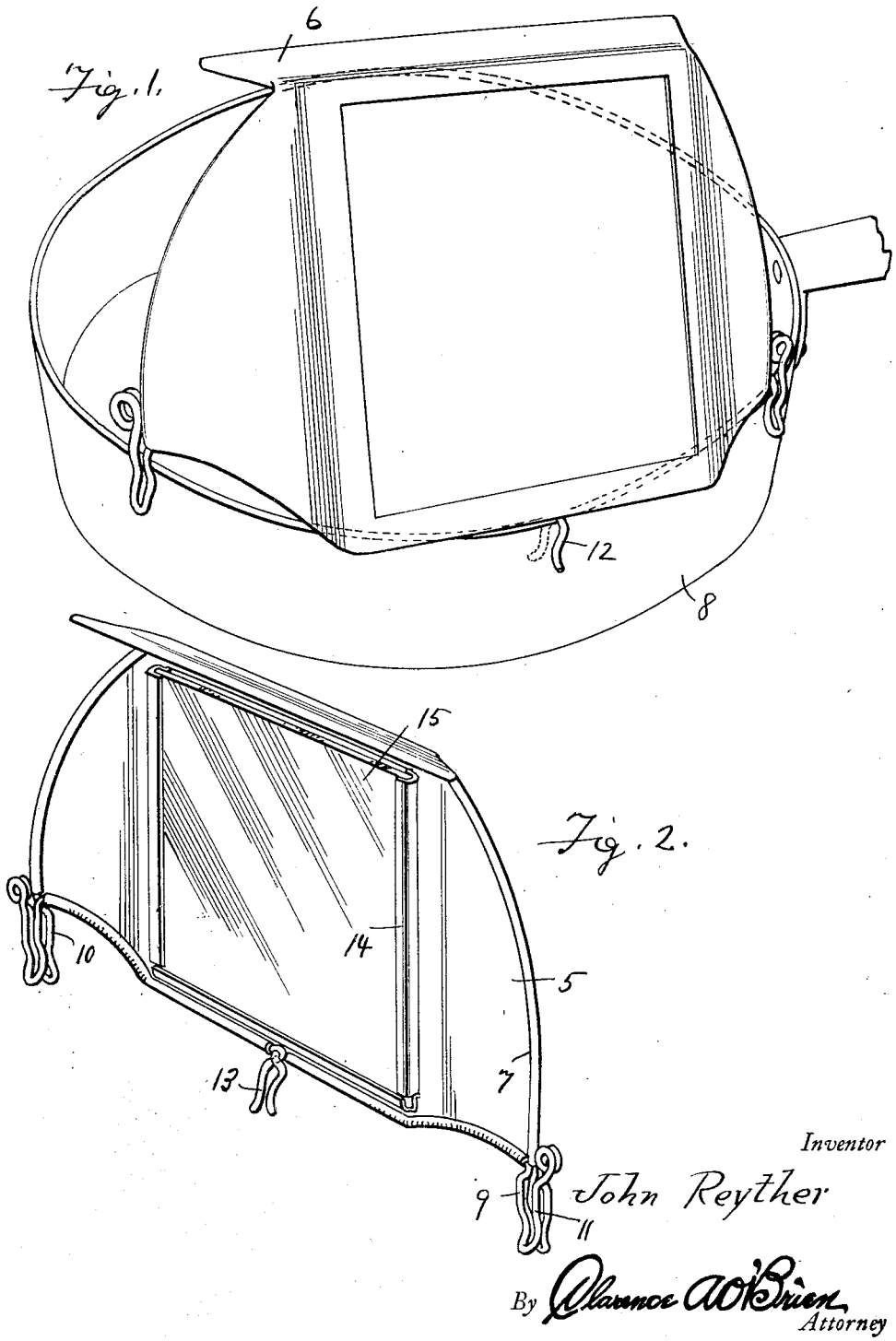

1,682,095

UNITED STATES PATENT OFFICE.

JOHN REYTHER, OF ENNIS, TEXAS.

PAN SHIELD.

Application filed June 20, 1927. Serial No. 200,133.

My invention relates to shields for cooking utensils such as open pots and pans and has for an object to provide a device of this character to protect the cook against injury from grease or other liquid spattered from the pan.

Another object of the invention is to provide a shield of this character enclosing a substantial portion of the pan and having a transparent section formed therein whereby the condition of the food within the pan may be observed.

A further object is to provide means for easily and quickly attaching the shield to the edge of the pan.

Other objects and advantages reside in the special construction, combination and arrangement of the various elements forming the invention as more fully hereinafter described and claimed, reference being had to the accompanying drawings forming part hereof, wherein:

Figure 1 is a perspective view showing my invention in operative position upon a frying pan, and Figure 2 is a rear perspective view of the shield in detached position.

Referring now to the drawing, I have shown my invention comprising a shield having a substantially vertically arranged section 5 of curved formation to conform to the curvature of the upwardly extending walls of a cooking utensil 8, said vertically arranged section 5 having a substantially horizontal inwardly extending section 6 formed integrally at the upper end thereof. The edges of both the sections 5 and 6 are turned inwardly to form a beading 7 extending entirely thereabout.

The beading at the lower edge of the section 5 has its ends arranged to receive one end of a wire clip 9 formed of a single strand of spring pressed wire, with the other end of said clip extending within the end of the beading formed at the sides of the shield. The intermediate sections of the clip are formed into a pair of vertically extending pan engaging arms 11 arranged in spaced parallel relation whereby to engage opposite edges of the pan. A pan clip 12 is also arranged intermediate the bottom ends of the shield and comprises a pair of wire sections each having an end inserted within the beading with the opposite ends indicated at 13 twisted in a vertically disposed position and arranged parallel with each other whereby to engage opposite sides of the pan. In this manner the shield may be readily fastened in position upon the upper edge of a pan and at the same time may be easily removed therefrom when desired.

A substantially enlarged opening is formed within the vertical section 5 of the shield, the lower and side edges of said opening being formed into guides 14 adapted to retain in position over the opening a section of transparent material such as glass or isinglass. The guide 14 may be omitted from the upper edge of the opening whereby to permit the glass to be moved upwardly and removed from the shield.

It is obvious that the invention is susceptible to various changes and modifications without departing from the spirit thereof or the scope of the appended claim and I accordingly claim all such forms of the device to which I am entitled.

I claim:

A shield for cooking utensils comprising a shield section arranged substantially vertically with respect to the utensil and having a relatively enlarged opening formed therein with channel shaped guides formed about its side and bottom edges and adapted to removably carry a transparent cover for the opening, a horizontal section extending inwardly from the upper end of the shield over a portion of the utensil, said shield having its lower edge turned inwardly to form a tube separated intermediate its ends and a strand of wire inserted in each end of the tube, the inner ends of the wire being twisted about each other combining to form an intermediate attaching clip and the outer ends thereof forming end attaching clips depending from the lower edge of the shield.

In testimony whereof I affix my signature.

JOHN REYTHER.